Figure 1:
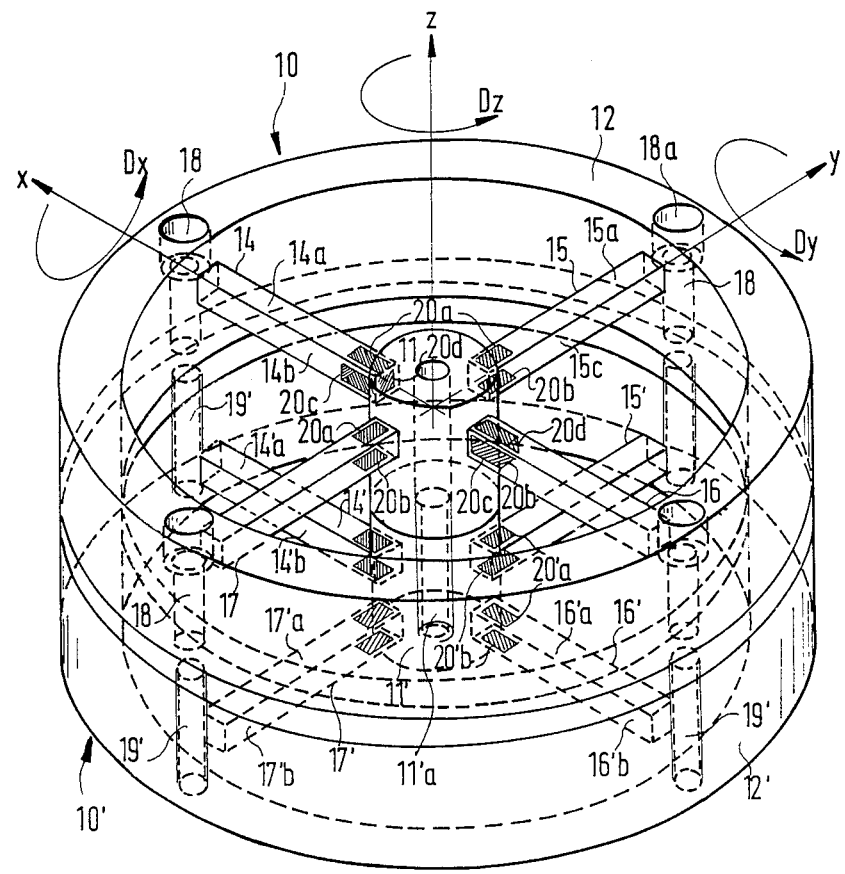

United States Patent [19]

Dietrich et al.

[11] Patent Number: 4,763,531
[45] Date of Patent: Aug. 16, 1988

[54] FORCE-TORQUE SENSOR

[75] Inventors: Johannes Dietrich; Jörg Schott, both of Gilching, Fed. Rep. of Germany

[73] Assignee: Deutsche Forschungs-und Versuchsanstalt fur Luft und Raumfahrt e.V., Bonn, Fed. Rep. of Germany

[21] Appl. No.: 33,511

[22] Filed: Apr. 1, 1987

[30] Foreign Application Priority Data

Apr. 4, 1986 [DE] Fed. Rep. of Germany ....... 3611336

[51] Int. Cl.$^4$ ........................... G01L 5/16; G01L 1/22
[52] U.S. Cl. ................................ 73/862.04; 73/862.65
[58] Field of Search ........... 73/862.65, 862.04, 862.05, 73/862.06, 147

[56] References Cited

U.S. PATENT DOCUMENTS 3,867,838 2/1975 Gerresheim ...................... 73/862.04
4,573,362 3/1986 Amlani ............................ 73/862.04
4,640,138 2/1987 Meyer et al. ..................... 73/862.04

Primary Examiner—Charles A. Ruehl
Attorney, Agent, or Firm—Collard, Roe & Galgano

[57] ABSTRACT

A force-torque sensor is provided for measuring all six possible force and torque components in the Cartesian coordinate system by means of wire strain gauges. The sensor has two identically designed integral spoke wheels each consisting of a rigid cylindrical outer ring and a central hub interconnected by four spokes. Proximate to the hubs of the two spoke wheels, such hubs being rigidly and solidly connected with each other, wire strain gauges are mounted in pairs on opposed spoke surfaces perpendicular to the central axis, as well as on the opposed surfaces of one diagonal pair of spokes of one of the two spoke wheels, the latter surfaces extending perpendicular to the former.

8 Claims, 3 Drawing Sheets

FORCE-TORQUE SENSOR

The present invention relates to a force-torque sensor for measuring all six possible force and torque components in the Cartesian coordinate system.

A force-torque sensor is disclosed in German Patent No. DE 27 27 704, however, with this known force-torque sensor, the fabrication of the bending body used therein is very expensive and therefore disadvantageous. Furthermore, the manual mounting with adhesive and the subsequent separate wiring of at least 16 wire strain gauges is very time-consuming and complicated such that such assembly can be carried out only by highly trained and suitably skilled personnel. In addition, expensive and highly sensitive amplifier electronics must be connected to the output side of the strain gauges.

The object of the present invention, therefore, is to provide a highly accurate force-torque sensor that can be manufactured simply and inexpensively. With the sensor according to the present invention, the forces acting on it are transformed into flexures of individual elements, which are then sensed by means of wire strain gauges. Furthermore, the sensor according to the present invention is designed in such a way that the wire strain gauges can be mounted quickly and simply with precision.

The above object is accomplished in accordance with the present invention with a force-torque sensor formed with two identically designed, integral spoke wheels, each of which consisting of a rigid cylindrical outer ring and a rigid center hub, wherein the outer ring and hub are connected with each other by at least three, preferably four spokes disposed in a plane. The hubs, in the direction of the central axis of the sensor, have a greater height than the cylindrical outer rings, and the two wheels are rigidly and solidly connected with each other in such a way that the respective spokes are arranged in exact alignment with one another.

Thus, the sensor of the present invention provides a very special measuring body in which the forces acting on it are transformed in the individual elements into flexures. The two wheels, which are connected with each other at their hubs, can be easily manufactured preferably by cutting disks made of aluminum or steel from drawn rod stock and subsequently working both sides of the disks by turning. Thereafter, only one side of the disk requires milling, whereupon the spoke wheel is basically finished.

According to a preferred embodiment of the present invention, the cylindrical outer ring of one wheel is provided with bores, preferably slightly countersunk bores, whereas the other wheel preferably has bores with female threads in corresponding locations. The slightly countersunk bores are sufficiently large to accommodate therein screw bolts with play, such bolts being screwed into the bores in the other wheel having the female threads with their ends having the male threads. In this manner, effective overload protection is simply incorporated in the sensor of the invention.

Furthermore, according to the invention, the strain gauges are mounted, in each case in pairs, close to the spokes on all opposed surfaces of the spokes disposed in planes extending parallel with each other and perpendicular to the central axis of the sensor, as well as on the opposed surfaces of any diagonal pair of spokes of one of the two wheels. These latter surfaces extending perpendicular to the former ones.

So that the total number of 20 strain gauges can be advantageously mounted simply and in a short time, the hubs of the spoke wheels, which are connected with one another, have a profile at their free ends. This profile can for example be in the form of a flattening of an otherwise round cross section, or in the form of a polygonal outer surface, or even in the form of notches.

In order that four to a maximum of six wire strain gauges can be mounted on each of the three, preferably four spokes of each wheel, the wire strain gauges are mounted appropriately aligned on a carrier film, which, in its center, has a recess corresponding to the profile of the hub. With this central recess, the carrier film will center itself, for example when adhered to a wheel, and thereafter can be mounted on the spokes in a single work step by means of a correspondingly shaped punch, said spokes being provided, for example with adhesive.

The wire strain gauges mounted on the lateral surfaces of the diagonal pair of spokes can be secured thereon in the same assembly step either by means of the same correspondingly designed punch, or they can be pressed on, for example by hand, after the other wire strain gauges have been adhered to the surfaces of the three, preferably four spokes arranged in a single plane. The accuracy with which the wire strain gauges are mounted on the various surfaces of the spokes therefore only depends on the precision with which the carrier film having the wire strain gauges mounted thereon has been manufactured, and how accurately the self-centering recess has been formed.

Therefore, owing to the advantageous design of the wheels forming the sensor, the individual wire strain gauges can be mounted with exact positioning at very low manufacturing cost, as the measurement points for picking up or measuring the individual deflections are disposed preferably close to the two hubs.

Furthermore, the force-torque sensor according to the present invention does not require the labor-intensive and thus cost-intensive wiring work for the individual wire strain gauges, as the latter are connected on the carrier film in a manner similar to a flexible printed circuit board. After the four carrier films have been adhesively positioned, i.e., after the 20 wire strain gauges have been mounted with precise positioning, the two wheels are solidly and rigidly connected with one another at their hubs.

Thereafter, the films supporting the wire strain gauges, which are disposed in four planes arranged one on top of the other, are wired together by simply threading wires through their ends. Even the electronic mother board can be mounted between the spoke wheels, or as an extension of one of the hubs of the sensor depending on the size of the latter, in which case the mother board supporting the electronic components can be connected as the four carrier films are being wired, i.e., in the same work step.

According to another embodiment, the stiffness of the individual spoke wheels and, thus, their stressability can be increased by arranging, in each case in the center between the spokes supporting the wire strain gauges, the same number of additional spokes in the plane of each wheel. This means that in such a stiffer embodiment of a force-and-torque sensor with higher stressability, six or preferably eight spokes are formed in two planes. Such a spoke wheel, too, can be manufactured as specified above, that is, from a disk cut from rod stock, which is subsequently finished in its basic form by two turning treatments followed by one milling operation.

The force-torque sensor according to the present invention is particularly advantageous in that for the measurement of the bending deformation, each spoke of the wheels, the latter being solidly and rigidly connected with one another at their hubs, need be fitted with only two opposed wire strain gauges, the latter being present at one contact point in each case and connected to a half-bridge.

In view of the symmetry incorporated in the inventive sensor, it is always possible to find two half-bridges suitable for connection to a full bridge for evaluation. As opposed to measurements with individual wire strain gauges, the principle of measuring with wire strain gauges that are connected to full bridges enhances the signal/noise ratio by a factor of 4, and by a factor of 2 as compared to measuring with half-bridges.

The sensor according to the present invention, although measuring with full bridges, needs only 20 wire strain gauges, whereas conventional arrangements often require as many as up to 32 wire strain gauges. By virtue of the way in which the spokes are arranged and the 20 wire strain gauges mounted and connected, a very high degree of decoupling between individual elements in the body of the sensor is accomplished, such degree being in the order of magnitude of about 100.

To simplify the processing of the voltages received from the wire strain gauges connected to full bridges, provision is made for a particularly simple process. For signal processing according to a preferred embodiment of the invention, all voltages supplied by the wire strain gauges - which are connected to full bridges - and deviating from zero are measured when no forces or torques act on the sensor. In this process, the error voltages, which are temperature-dependent, are measured and logged together with the temperature within the subsequent operating temperature range, and stored in a memory with consecutive allocation to the corresponding temperature. In the later or subsequent measuring operation, then, one needs only to recall from such memory the error voltages allocated to the measured temperature and subtract such error voltages from the actual measured voltages.

By the application of this method, not only is there a substantial increase in measurement accuracy and resolution power, but also, inexpensive small operation amplifiers can be used, which is a benefit derived from good decoupling in the sensor body. For this reason, the necessary sensor electronic components can be easily accommodated in or on the measuring body. Such electronic components supply the measured signals in digital sequential form, and the signals can be transmitted via simple and, thus, inexpensive cables, or even wireless.

Furthermore, if particularly accurate measurements are required, the error resulting from the temperature-dependent change of the k-factor of the wire strain gauges can be excluded by additionally storing it in accordance with the charge specified by the manufacturer. If no such charge is available, the error can be determined by an additional calibration process, in which case such error is simply entered in accordance with the measured temperature in an additional compensation computation as a multiplicative factor.

Other objects and features of the present invention will become apparent from the following detailed description considered in connection with the accompanying drawings. It is to be understood, however, that the drawings are designed as an illustration only and not as a definition of the limits of the invention.

Figure 2A:
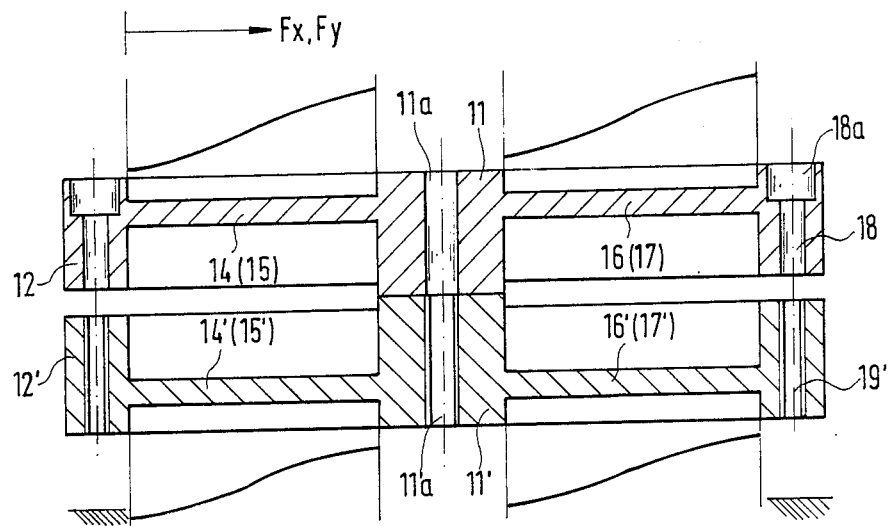
Figure 2B:
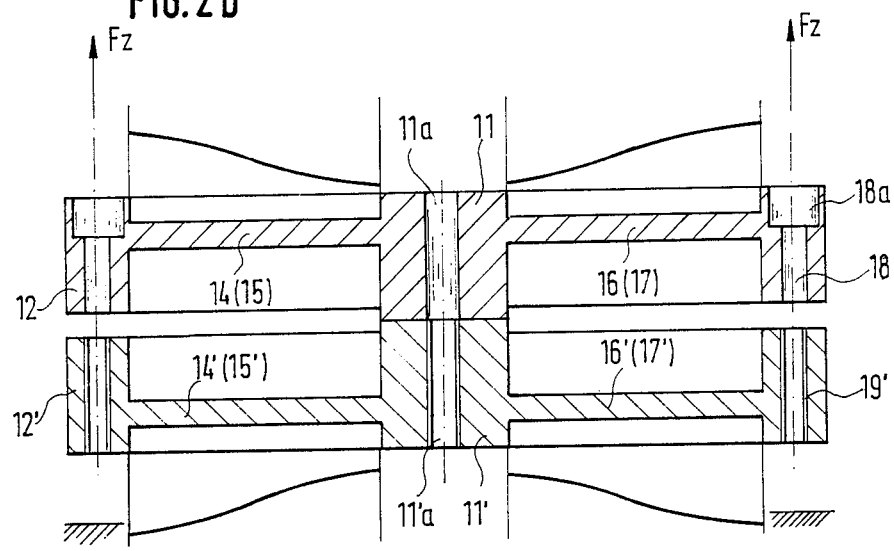
Figure 3A:
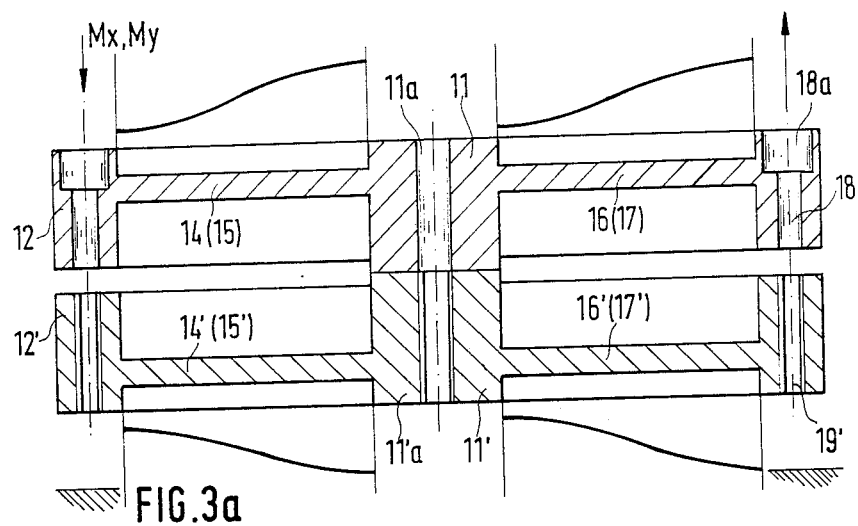
Figure 3B:
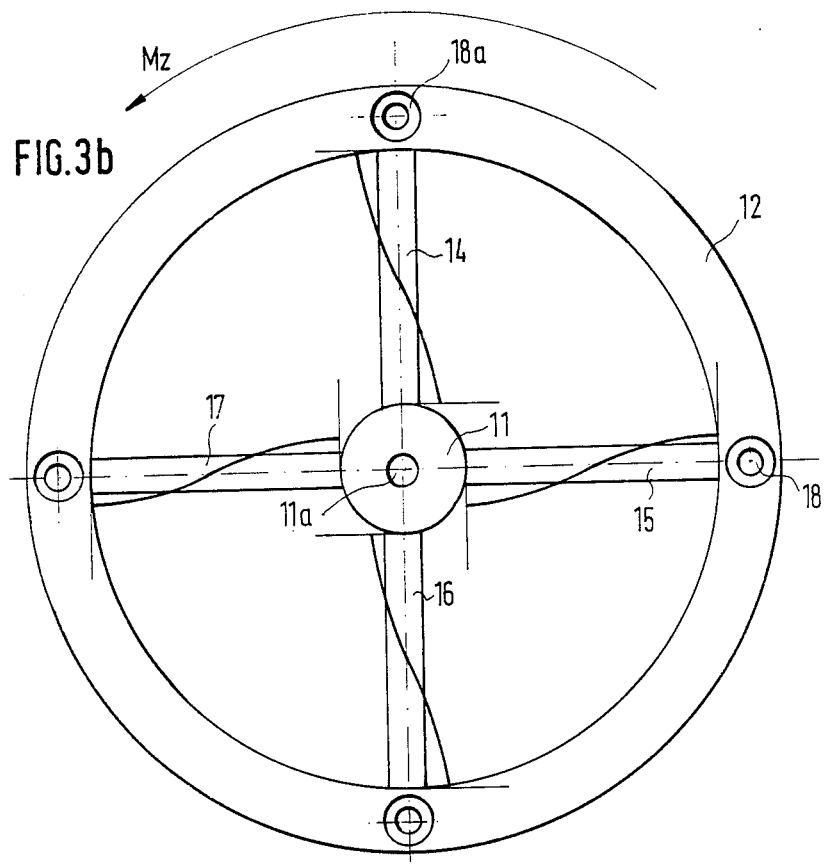

In the drawings, wherein similar reference characters denote similar elements throughout the several views:

FIG. 1 is a schematic perspective view of a preferred embodiment of a force-torque sensor according to the present invention;

FIGS. 2a and 2b are diagrammatic views of the forces produced in the sensor of the present invention in the direction of the three axes of the Cartesian coordinate system; and FIGS. 3a and 3b are diagrammatic views similar to FIGS. 2a and 2b of the moments produced in the sensor of the present invention due to bending deformations.

Now turning to the drawings, there is shown in FIG. 1 a force-torque sensor according to a preferred embodiment of the present invention which has a completely symmetrical design with respect to the three axes of the Cartesian coordinate system, i.e., with respect to the X-, Y- and Z- axes. In this embodiment, the sensor consists of two identically designed wheels 10 and 10'. Each of the two wheels 10 (10') consists of a rigid, cylindrical outer ring 12 (12') and a rigid central hub 11 (11'), which, in the preferred embodiment, are connected with each other by four spokes 14 to 17 (14' to 17') disposed in a plane. The four spokes 14 to 17 (14' to 17') are arranged displaced from each other with equal angular spacings, i.e., by 90°.

Theoretically, three spokes in each wheel would suffice for measurements, in which case they would be arranged at an angular spacing of 120°. However, in the present embodiment, this would mean that the sensor would be asymmetrical, which in turn would be unfavorable with respect to signal processing.

As also seen in FIG. 1, hubs 11 and 11' of the two wheels 10 and 10' have a greater height in the direction of the central axis of the sensor, that is, in the direction of the Z-axis, than the outer rings 12 and 12'. In this way, the two outer rings 12 and 12' of the sensor are arranged with a selectable yet sufficient spacing between each other.

In outer ring 12 of wheel 10, four bores 18 with countersinks 18a are formed with the same angular spacings therebetween. Four bores 19' with female threads are provided in corresponding or matching locations in outer ring 12' of the other wheel 10'. In the embodiment shown in FIG. 1, bores 18 and 19' are provided in alignment with spokes 14 to 17 and 14' to 17', respectively. However, such bores can be located in the two outer rings 12 and 12' also centrally between the spokes, so that the symmetry of the two wheels is preserved irrespective of the arrangement selected for bores 18 and 19'. Bores 18 are dimensioned in such a way that the screw bolts (not shown in the drawing) are accommodated therein with play, such bolts being screwed into the female-threaded bores 19' in outer ring 12'. In this way, a high overload protection is created, which is integrated in the sensor of the invention in a simple manner.

As also shown in FIG. 1, wire strain gauges 20a and 20b (20'a and 20'b, are mounted on all surfaces 14a to 17b (14'a to 17'b) of corresponding spokes 14 to 17 (14' to 17'), respectively. Surfaces 14a to 17b (14'a to 17'b) are disposed in planes extending perpendicular to the central axis of the sensor, i.e., perpendicular to the Z-axis, such planes extending parallel with each other.

In view of the fact that maximum bending deformation will occur always at the clamping or securement points of the spokes, which can be viewed as spars that are solidly clamped on both sides, wire strain gauges 20a, 20b (20'a, 20'b) are preferably mounted within the proximity of hub 11 (11') for reasons of sensitivity and temperature effects. In addition, another pair of wire strain gauges 20c and 20d is mounted on lateral surfaces 15c, 15d and 16c, 16d of a diagonal pair of spokes 15 and 16 of top wheel 10 (FIG. 1). With the force-torque sensor according to the invention, the four wire strain gauges mounted on the lateral surfaces can be installed on any desired diagonal pair of spokes of one of the two spoke wheels 10 and 10'.

As stated above, an aluminum or steel disk cut from drawn rod stock can be used for the manufacture of each of the two spoke wheels 10 and 10', so that in the radial directions, the properties of the material can be viewed as being practically the same. The final shape of the wheels can be obtained by simply working both sides of the disks by turning and then milling one side of the disks. For the connection of hubs 11 and 11', a bore 11a is required in the former and a bore 11'a with female thread in the latter. Furthermore, bores 18 and 19' for the overload protection, as well as possibly a number of additional bores for mounting the sensor of the invention, can be provided for example by a robot.

All forces $F_x$, $F_y$ and $F_z$ or moments $M_x$, $M_y$ and $M_z$ acting on the sensor body are transformed in the spokes 14 to 17 (14' to 17') into proportional bending deformations. The bending deformations caused by the forces $F_x$, $F_y$ and $F_z$ and by the moments $M_x$, $M_y$ and $M_z$ are shown diagrammatically in FIGS. 2a, 2b and 3a, 3b, respectively.

In any conceivable case of stressing, defined spokes can always be specified that deform or bend due to the stress. The bending deformation resulting therefrom is always significantly greater than the elongation or compression of the other spokes caused by tension or compression.

For reasons of measuring sensitivity, the evaluation of the bending deformations $e_b$ is significantly more favorable than the interpretation of the tension and compression deformations $e_z$, as the following applies under the same load conditions to a spar or beam of length 1 with a square cross section of dimension h, such spar or beam being clamped on both sides:

$$e_b/e_z = 3(1/h)$$

Consequently, with a cube-like shape of the spoke, i.e., with a spoke having the same dimension of length, width and height, the measuring sensitivity obtained for bending deformation is three times the one for tensile deformation. Due to the special design of the sensor body, specific spokes will always absorb the stress (to be measured) as bending stress.

The 20 wire strain gauges mounted on the sensor of the invention supply seven voltages ($U_1$ to $U_7$), which must be amplified 500 to 1000 times and subsequently converted into digital values. Such high amplification may lead to problems if the properties of the amplifiers are not ideal for the most part especially with respect to temperature drift, in which case each error voltage of the amplifier would be available at its output multiplied by the amplification factor. The measuring result is falsified especially by error voltages that change with the temperature of the arrangement.

Heretofore, two different methods have been used for the evaluation of the voltages supplied by wire strain gauges. In the one case, only an expensive special amplifier is used with a multiplexer arranged on its input. The voltages received from the wire strain gauges by the multiplexer are successively put through by the latter to the amplifier input. Following evaluation of the transient time to final value, the output voltage is processed further by an A-D-converter. In this case, the problem arising from temperature drift can be resolved only through separate acquisition of the error voltage present at the given moment, which is accomplished by subtracting it from the other measured values.

Theoretically, however, this method violates the scanning theorem in that the voltages supplied by the wire strain gauges cannot be low-pass filtered ahead of the multiplexer in accordance with the scanning frequency. This can lead to significant measuring errors especially when measuring oscillating systems.

Furthermore, the special amplifier must have a high band width so as to be able to rapidly respond to the given signal level. This, however, in turn results in a clearly increased noise level. Consequently, even the slightest errors in the multiplexer, which are multiplied by the amplification factor, assume significance as measuring errors.

With the other method, a separate and, therefore, more expensive individual amplifier with extremely little drift is used for each voltage received by means of one wire strain gauge, and the output voltages of the individual amplifiers are transmitted to the A-D-converter via a multiplexer. This permits analogous filtering of each channel. In this case, too, the drawbacks are: very high component cost and high power and space requirements.

With the signal processing intended in connection with the force-torque sensor according to the present invention, all voltages deviating from zero and supplied by the sensor when no forces or moments act on it, are classified as error voltages whose quantity is temperature-dependent. All such error voltages are logged in an evaluator and stored in the computer in the form of a list. The temperature prevailing in the sensor body is measured as an additional measured value. The amplifier electronics are also accommodated on the sensor body.

The complete sensor body with the amplifiers accommodated therein is now subjected to a so-called error voltage acquisition cycle within an operating temperature range conforming to its later application. In such a cycle, all output voltages of the amplifiers are consecutively logged and stored together with the gradually changing temperature.

During the later operation, all that remains to be done is to recall from the digital memory the error voltages allocated to the temperature prevailing at the given moment and to subtract such error voltages from the actual measured voltages, which supplies the exact measured value.

Subsequently, this advantageous process permits compensation of all additive measurement errors within the entire operating temperature range. Only one error remains thereafter due to the temperature-dependent change in the k-factor of the wire strain gauges. However, since this influence is generally specified on each wire strain gauge charge and the temperature is measured constantly, it may be eliminated as a multiplicative factor in an additional compensation calculation.

The output voltages of the individual amplifiers are applied to the A-D-converter via a multiplexer having an additional channel for the temperature sensor. The present method, which could be called also digital temperature drift compensation, permits the use of a great number of operation amplifiers, which can be optimally selected with respect to availability, noise, voltage supply, space requirements and not least also with respect to price, as their temperature drift characteristics are practically insignificant.

It is beneficial to the technical realization of this method that altogether only seven wire strain gauge voltages need to be acquired, and that the eighth multiplexer channel can be used for temperature acquisition. With a test arrangement for which these aspects were taken into account, excellent values were demonstrated with respect to noise characteristics, whereby the entire electronics had to be supplied with only a voltage of 5 volts.

With the test arrangement, a resolution of 1:2000 at 3dB-limit frequency of 1 kHz was achieved for the measuring signals of the 6D-force-torque sensor of the invention, at very low prime cost. In addition, it was possible to reduce the design volume for the electronics by about a factor of 100.

While only a single embodiment of the present invention has been shown and described, it will be obvious that many changes and modifications may be made thereunto without departing from the spirit and scope of the invention.

What is claimed is:

1. A force-torque sensor for measuring six force and torque components in the Cartesian coordinate system by means of strain gauges, said sensor comprising:

two identically designed integral spoke wheels, each said wheel consisting of a rigid cylindrically shaped outer ring and a rigid central hub interconnected by at least three spokes disposed in the X-Y plane, each of said hubs having a greater height than the cylindrical outer ring in the direction of the central axis or Z coordinate, said hubs being rigidly and solidly connected with each other so that the corresponding spokes are arranged in alignment with each other; and wire strain gauges mounted proximate to said hubs in pairs on all opposed spoke surfaces disposed in the X-Y plane extending parallel with each other perpendicular to the central axis of the sensor, and on opposed surfaces of a diagonal pair of spokes of one of said two wheels, said latter surfaces extending perpendicular to the former.

2. The force-torque sensor according to claim 1, wherein the total number of spokes on each wheel is four, said spokes being arranged at equal angular displacements.

3. The force-torque sensor according to claim 1, wherein for overload protection, screw bolts are accommodated with play in the cylindrical outer ring of one spoke wheel in countersunk bores, said bolts being threadably received in the other spoke wheel in bores having female thread.

4. The force-torque sensor according to claim 1, wherein said spoke wheels are disks formed of aluminum and cut from drawn rod stock, each disk being subsequently worked by turning on both sides and thereafter worked by milling on one side, and finally provided with a plurality of bores in the outer ring with and without female thread.

5. The force-torque sensor according to claim 1, wherein four to six wire strain gauges are arranged in alignment with the spokes of the wheel on a carrier film, said carrier film having a center recess matching the hub, so that the carrier film with the four to six wire strain gauges, after alignment of the latter with respect to the hub, is attachable to the spokes in a self-centering manner in a single work step by means of a correspondingly shaped punch, said spokes being provided with adhesive.

6. The force-torque sensor according to claim 1, wherein for signal processing, all voltages supplied by the strain gauges and deviating from zero are, when no forces and torques act on the sensor, consecutively acquired and stored by a calibration process in the subsequent operating temperature range in addition to the measured temperature value, as error voltages dependent on temperature with respect to their quantity; and during the subsequent measuring operation, the error voltages so allocated to the prevailing temperature are recalled from the stored memory and subtracted from the actual measured voltages.

7. force-torque sensor according to claim 6, wherein the error resulting from a temperature-dependent change in the k-factor of the strain gauges is also stored in correspondence with the strain gauge charge specified by the manufacturer, or in correspondence with an additional calibration process, and entered in an additional compensation calculation as a multiplicative factor in correspondence with the measured temperature.

8. The force-torque sensor according to claim 1, wherein said spoke wheels are disks formed of steel and cut from drawn rod stock, each disk being subsequently worked by turning on both sides and thereafter worked by milling on one side, and finally provided with a plurality of bores in the outer ring with and without female thread.

* * * * *